United States Patent [19]
Russell

[11] 3,712,688
[45] Jan. 23, 1973

[54] MODIFICATION MEANS FOR CHANGING WHEELED VEHICLES TO ALL-TERRAIN VEHICLES

[76] Inventor: Kenneth M. Russell, 1070 Forestvale Lane, Helena, Mont. 59601

[22] Filed: March 17, 1971

[21] Appl. No.: 125,308

[52] U.S. Cl.................305/34, 305/35 EB, 152/334
[51] Int. Cl. .............................................B62d 55/24
[58] Field of Search....152/56, 58, 67, 170, 173, 174, 152/175, 178, 179, 334, 185–187, 190, 191; 305/34; 74/13, 14, 15; 301/38 R, 39 R

[56] References Cited

UNITED STATES PATENTS

| | | | |
|---|---|---|---|
| 2,860,593 | 11/1958 | Laycock | 305/34 X |
| 1,935,950 | 11/1933 | Lawrence | 152/187 X |
| 2,416,183 | 2/1947 | Kraft | 305/34 X |
| 3,313,263 | 4/1967 | Ferguson | 305/34 X |
| 3,170,533 | 2/1965 | Fewel | 305/34 X |

Primary Examiner—Richard J. Johnson
Attorney—Merchant & Gould

[57] ABSTRACT

A cylindrical drum coaxially affixed to each wheel of a wheeled vehicle so as to rotate therewith, endless belts affixed in overlying relationship to the drums and tires fixedly attached in a flat orientation to the outer surface of the endless belts to provide support for the vehicle for substantially any terrain.

5 Claims, 3 Drawing Figures

PATENTED JAN 23 1973 3,712,688

INVENTOR.
KENNETH M. RUSSELL
BY
Merchant & Gould
ATTORNEYS

MODIFICATION MEANS FOR CHANGING WHEELED VEHICLES TO ALL-TERRAIN VEHICLES

BACKGROUND OF THE INVENTION

1. Field of the Invention

All-terrain vehicles are vehicles which can travel over substantially any terrain, such as water, swamp land, snow, dry ground, etc. All-terrain type vehicles are becoming popular with sportsmen in a great variety of recreational activities.

2. Description of the Prior Art

The prior art all-terrain vehicles, which are known to the inventor, are all constructed especially for movement over all types of terrain and, therefore, are specialized and not useful for other purposes. For example, all-terrain type vehicles are generally relatively slow on highways and dry ground. Also, all-terrain type vehicles are generally not useful for draft purposes and the like. Further, because the all-terrain vehicles are built for one special purpose, i.e. travel over all types of terrain, they are expensive, they constitute additional equipment to store, and they must be purchased in addition to other vehicles rather than in place of other vehicles.

SUMMARY OF THE INVENTION

The present invention pertains to modification means for changing wheeled vehicles to all-terrain vehicles including a plurality of cylinders with means for affixing one each of said cylinders to the wheels of a vehicle and a plurality of flat, endless belts each having a plurality of tires affixed to the outer surface thereof in flat side-by-side relationship with said endless belts affixed in overlying relationship on said cylinders so as to rotate with the wheels of the vehicle.

It is an object of the present invention to provide means for modifying substantially any vehicle to change it to an all-terrain vehicle.

It is a further object of the present invention to provide modification means which are relatively simple and inexpensive to manufacture and use.

It is a further object of the present invention to provide modification means for wheeled vehicles wherein vehicle tires, which term includes the outer shell and/or the inner tube, are utilized as the surface on which the vehicle travels and is supported.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figures 1, 2, 3:
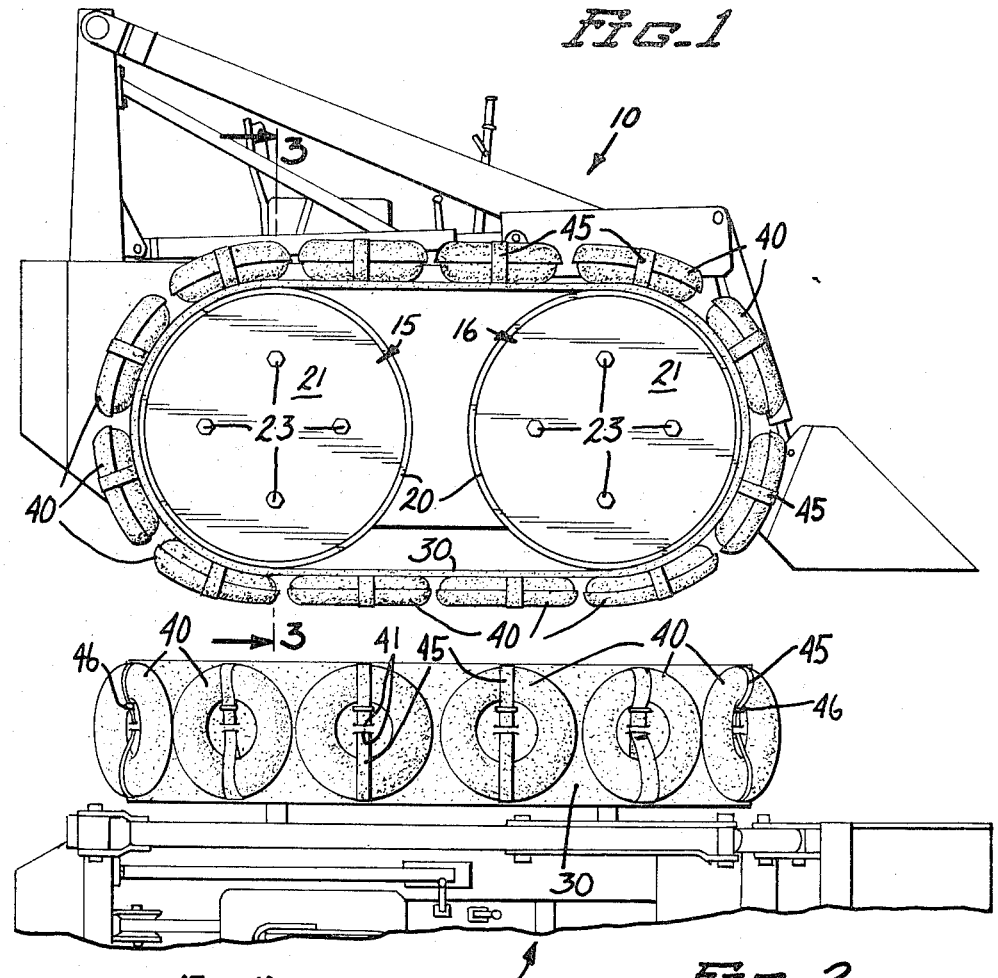
FIG. 1 is a view in side elevation of a vehicle having the present modification means affixed thereto.
FIG. 2 is a view in top plan of the apparatus illustrated in FIG. 1, portions thereof broken away.
FIG. 3 is an enlarged sectional view as seen from the line 3—3 in FIG. 1, portions thereof shown in full.

In the figures the numeral 10 generally designates a wheeled vehicle, which in this embodiment is illustrated as a front-end loader. The front-end loader type vehicle 10 is directed or steered by means of individual hand brakes or individual driving means for wheels on either side of the vehicle 10. The particular vehicle 10 illustrated is a four-wheel drive vehicle but it should be understood that the present modification means might be utilized on a great variety of wheeled vehicles and the embodiment of the modification means is limited only by the type of steering incorporated in the vehicle.

Referring to FIG. 3 a cross-sectional view of a wheel 11 of the vehicle 10 is illustrated. The modification means includes circular cylinders 15 and 16 engaged over the back and front wheels 11, respectively, of the vehicle 10. Each of the cylinders 15 and 16 is similar and includes a cylindrical or tubular outer wall 20 and a wall 21 extending diametrically across the opening defined by the outer wall 20. The wall 21 is spaced inwardly from an outer edge of the outer wall 20 a sufficient distance to form a cavity 22 large enough to receive the wheel 11 coaxially therein. In this embodiment four holes are formed in the wall 21 and four coaxially aligned holes are formed in the wheel 11 so that bolts 23 are received therethrough and affix each of the cylinders 15 and 16 firmly to the wheels 11. It should be understood that other means might be utilized to affix the cylinders 15 and 16 to the wheels 11 but the bolts 23 and wall 21 are described herein because of their simplicity and ease of installation.

In the present embodiment an endless belt 30 is engaged in overlying relationship around cylinders 15 and 16 on each side of the vehicle 10. The endless belt 30 may be a metal link chain type, a woven belt, rubber belt, or any of the great variety of belts available on the market. While no belt tighteners are illustrated, it should be understood that some form of belt tightener will generally be incorporated to insure proper frictional engagement between the cylinders 15, 16 and the endless belt 30. It may also be necessary to provide belt engaging protrusions on the outer surface of the outer walls 20 of each of the cylinders 15 and 16 to insure proper movement of the endless belts 30 with the cylinders 15 and 16. In the present embodiment the endless belts 30 are rubber link belts which frictionally engage the outer surfaces of the cylinders 15 and 16.

A pneumatic, toroidal-shaped, automotive-type tires 40 are provided and positioned on each of the endless belts 30 in a generally flat orientation with the axis of each tire 40 generally perpendicular to the portion of the endless belt 30 adjacent the tire 40. In the present invention the term "tire" is defined to include the outer shell and/or the inner tube, either or both of which may be inflatable separately or in combination. It is anticipated that used tires may be utilized in the modification kit for economical purposes, although new ones may be utilized if desired.

A pair of openings 41 are formed in the endless belts 30 approximately centrally within each of the tires 40 positioned thereon. A strap 45 is associated with each of the tires 40 and is threaded around the associated tire 40 at diametrically opposed portions thereof and through the associated openings 41 in the endless belt 30. Each strap 45 has securing means 46 which engages both ends of the strap 45 and maintains it tautly in position. Thus, each strap 45 maintains a tire 40 fixedly engaged on the outer surface of the endless belt 30 in a generally flat orientation. The tires 40 are positioned in side-by-side relationship around the entire outer surface of the endless belt 30 so that the vehicle 10 is supported thereon. In this manner the vehicle 10 is modified to become a vehicle which can travel on substantially any surface. If the vehicle 10 is to travel over water the tires 40 must be inflated, whereas if the vehicle 10 is to travel over snow or soft earth the tires 40 may simply be uninflated outer casings. Since the endless belts 30 are positioned in overlying engagement with the front and rear wheels 11 of the vehicle 10, individual means for controlling the brakes or power of the wheels on opposite sides of the vehicle must be provided to steer the vehicle. However, if a steering wheel or the like is to be utilized an endless belt with tires affixed thereto as described may simply surround the cylinder attached to each wheel.

Thus, apparatus is disclosed for modifying a wheeled vehicle to provide an all-terrain vehicle. The present modifying means can be utilized on substantially any vehicle and are simple to produce and utilize. Further, the present modifying means are inexpensive and do not require the utilization of a special vehicle but may be applied to substantially any wheeled vehicle.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. Apparatus for changing wheeled vehicles to all-terrain vehicles comprising:

a. a plurality of cylinders;
    b. means for affixing one each of said plurality of cylinders to the wheels of a vehicle, including a wall within each of the cylinders which extends diametrically across the cylinder and a plurality of bolts extending through holes in each of said walls and an adjacent one of the wheels of the vehicle for maintaining each of the cylinders in tight coaxial engagement with a wheel of the vehicle;
    c. a plurality of generally flat, endless belts affixed in overlying relationship to said cylinders for rotation therewith;
    d. a plurality of toroidal-shaped tires; and
    e. means for affixing said tires in side-by-side relationship to the outer surface of said belt with the tires oriented so the axis of each tire is perpendicular to the plane of the portion of belt adjacent the tire.

2. Apparatus as set forth in claim 1 wherein the cylinders have an outer diameter at least as large as the outer diameter of the wheels of the vehicle.

3. Apparatus as set forth in claim 1 wherein the tires are an inflatable type.

4. Apparatus as set forth in claim 1 wherein the means for affixing the tires to the belt include a plurality of elongated elastic straps attached to said belt in encircling engagement with said tires.

5. An all-terrain vehicle comprising a plurality of endless traveling surfaces for supporting and carrying said vehicle over the terrain, a plurality of inflatable, pneumatic, toroidal shaped tires affixed in a side-by-side relationship over each of said traveling surfaces in a terrain-engaging relationship, said tires being mounted flat against said traveling surfaces so that a normal axis of each said tire is perpendicular to the terrain when engaged therewith, and each said tire being affixed to said corresponding traveling surface by a strap encircling said tire and attached to said traveling surface.

* * * * *